(No Model.)
W. G. BLISS.
PRIVY STOOL.
No. 604,597. Patented May 24, 1898.
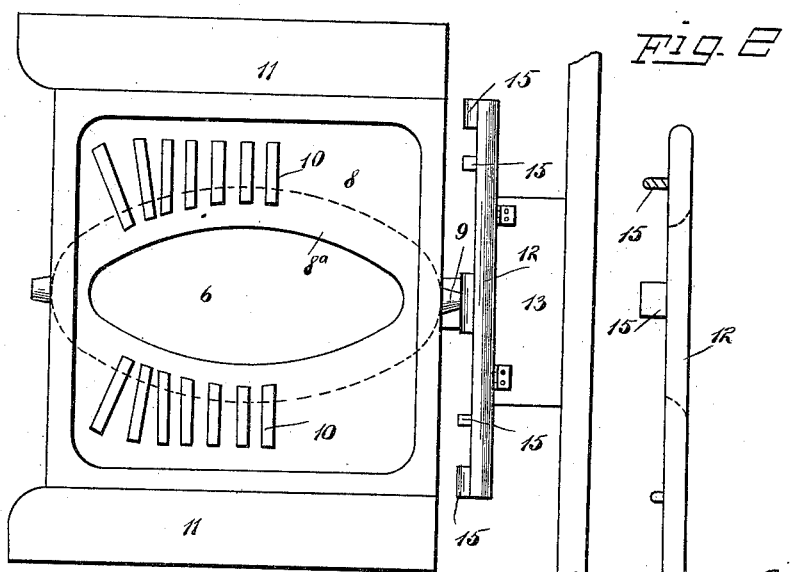
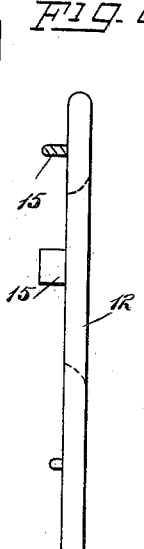
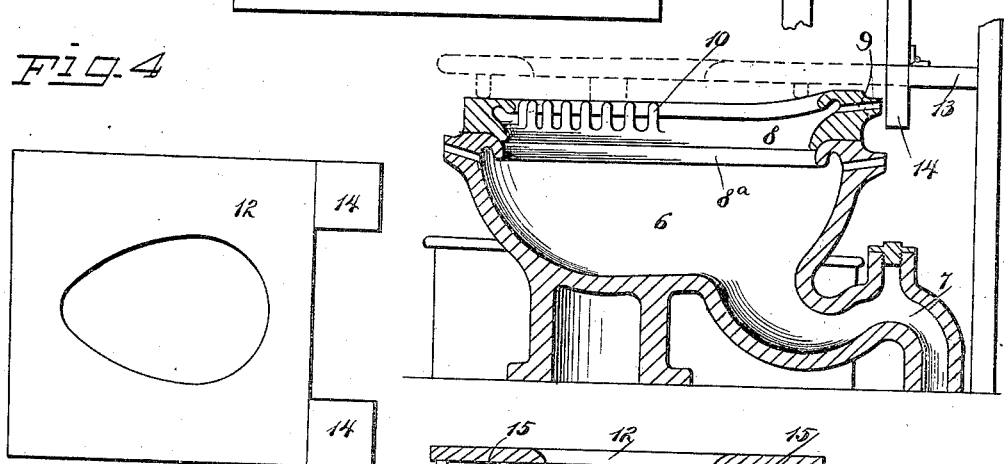
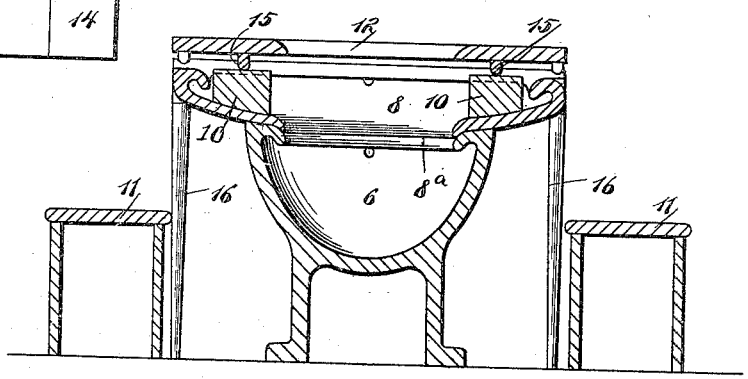
WITNESSES:
J. A. Brophy
INVENTOR
W. G. Bliss
BY
ATTORNEYS.
THE NORRIS PETERS CO., PHOTO-LITHO., WASHINGTON, D. C.

UNITED STATES PATENT OFFICE.

WILLIAM G. BLISS, OF CONSTANTINOPLE, TURKEY.

PRIVY-STOOL.

SPECIFICATION forming part of Letters Patent No. 604,597, dated May 24, 1898.

Application filed December 29, 1897. Serial No. 664,290. (No model.)

*To all whom it may concern:*

Be it known that I, WILLIAM G. BLISS, a citizen of the United States of America, residing at Constantinople, Turkey, have invented a new and Improved Privy-Stool, of which the following is a full, clear, and exact description.

This invention is a privy-stool constructed to permit persons to squat thereon, and thus avoid personal contact with the frequently foul and sometimes infected seats, the invention at the same time permitting the stool to be used in the ordinary manner, if desired.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1 is a plan view, the seat being raised. Fig. 2 is a vertical section. Fig. 3 is a similar view taken at right angles to Fig. 2, and Fig. 4 is a plan view of the seat.

The basin 6 and siphon 7 of the stool are of the usual construction. On the upper edge of the basin is mounted a pan or tray 8, which has a central opening $8^a$ communicating with the basin. The lower surface or bottom of the pan 8 is sloped gradually to the opening $8^a$, and the pan has an orifice 9 in its rear wall through which a jet may be passed to flush the upper surface of the pan. Legs 16 are attached to the pan and bear on the floor to assist in the support of the pan, as shown in Fig. 3. Projecting up from the bottom of the pan are two sets of ribs 10. Each set has its members arranged in close proximity to each other, so as to form a grating whereon a person's feet may be placed and by which the feet are kept from contact with the bottom of the pan. At each side of the stool is a step 11 to facilitate mounting the stool.

For such persons as desire it I provide a seat 12, which is hinged to a support 13 and provided with two weights 14, one at each side of said support, by which weights the seat is held raised to vertical position. The seat when horizontal is held down on the pan 8 by the weight of the person on the seat and covers the pan entirely to prevent any soiling of the clothing. The seat has projections 15 for engagement with the pan when in horizontal position.

By these means I provide a stool on which persons may squat, if they desire, without inconvenience to themselves and without danger of fouling the stool and on which persons who so desire may be seated, as usual.

Having thus described my invention, I claim as new and desire to secure by Letters Patent—

1. A privy-stool having a basin, a pan or tray mounted on the basin and having an opening registering with the basin, the pan or tray being extended horizontally beyond the sides of the basin and having a smooth top surface inclined gradually toward the opening in the pan or tray, two series of parallel ribs formed on the top surface of the pan or tray at the horizontally-extended portions thereof and located one series at each side of the opening therein, such ribs forming raised gratings on which the feet of a person may rest, and a weighted seat horizontally mounted adjacent to the basin and normally extending perpendicularly to expose the pan or tray, the seat being capable of swinging downward to cover the pan or tray.

2. A privy-stool having a basin, a pan or tray mounted on the basin and having an opening registering with the basin, the pan or tray being extended horizontally beyond the sides of the basin and having a smooth top surface inclined gradually toward the opening in the pan or tray, and two series of parallel ribs formed on the top surface of the pan or tray and at the horizontally-extended portions thereof and located one series at each side of the opening therein, such ribs forming raised gratings on which the feet of a person may rest.

WILLIAM G. BLISS.

Witnesses:
WILLIAM W. PEEL,
OSCAR S. HEIZER.